(12) United States Patent
Shi

(10) Patent No.: US 11,656,536 B1
(45) Date of Patent: May 23, 2023

(54) SOFTBOX LIGHT

(71) Applicant: Emart International, Inc., Rowland Heights, CA (US)

(72) Inventor: Tinglei Shi, City of Industry, CA (US)

( * ) Notice: Subject to any disclaimer, the term of this patent is extended or adjusted under 35 U.S.C. 154(b) by 0 days.

(21) Appl. No.: 17/849,807

(22) Filed: Jun. 27, 2022

(51) Int. Cl.
*G03B 15/06* (2021.01)

(52) U.S. Cl.
CPC .................................. *G03B 15/06* (2013.01)

(58) Field of Classification Search
CPC ...................................................... G03B 15/06
See application file for complete search history.

(56) References Cited

U.S. PATENT DOCUMENTS

| | | | | |
|---|---|---|---|---|
| 5,311,409 A | * | 5/1994 | King | ...................... G03B 15/06 362/17 |
| 10,268,105 B1 | * | 4/2019 | Zhu | ...................... F21V 7/0008 |
| 2005/0088836 A1 | * | 4/2005 | Lowe | ...................... G03B 15/06 362/18 |
| 2016/0018079 A1 | * | 1/2016 | Lin | ......................... G03B 15/06 362/352 |
| 2017/0248834 A1 | * | 8/2017 | Ortiz-Gavin | ........... G03B 15/06 |
| 2019/0377242 A1 | * | 12/2019 | Boerup | .................. G03B 15/06 |

\* cited by examiner

*Primary Examiner* — Evan P Dzierzynski
(74) *Attorney, Agent, or Firm* — Tsz Lung Yeung

(57) ABSTRACT

A softbox light includes a lighting element and a softbox lighting kit including a reflective cloth, a main bracket, a fixed base, a movable base, and an auxiliary bracket, wherein the main bracket is provided on the reflected cloth to allow the reflective cloth to be unfolded to form a box having a light outlet, wherein the auxiliary bracket is connected between the movable base and the main bracket, the movable base is movable with respect to the fixed base, wherein when the movable base is mounted and retained on the fixed base, the main bracket is unfolded by the auxiliary bracket to unfold the reflective cloth, wherein the lighting element is adapted to be installed on the movable base to project light beams to the reflective cloth.

9 Claims, 11 Drawing Sheets

SOFTBOX LIGHT

BACKGROUND OF THE PRESENT INVENTION

Field of Invention

The present invention relates to a photography lighting arrangement, and more particularly to a softbox lighting kit.

Description of Related Arts

Lighting has a significant impact on the final imaging effect during photographing. A softbox is a kind of photographic equipment that can cooperate with a photographic lamp to soften the harsh light and to provide a relatively soft lighting.

The conventional softbox, which is roughly in the shape of a bucket, generally includes a reflective cloth, a bracket and a central mount for installing the photographic lamp. When the photographic lamp is mounted on the central mount, the reflective cloth located around the photographic lamp can reflect the light beams from the photographic lamp.

The conventional softbox also may be configured in an umbrella shape to facilitate opening and closing, so the central mount is generally designed to include a fixed ring, a movable ring, and an umbrella shaft that passes through the fixed ring and the movable ring, the movable ring can move up and down along the umbrella shaft, so that the bracket connected to the movable ring is able to unfold or collapse the entire reflective cloth. The photographic lamp is adapted to be mounted on the movable ring, and when the movable ring is moved to be connected to the fixed ring, the entire softbox can be stretched to function as a photographic tool. When the movable ring is detached from the fixed ring, the entire softbox can be collapsed.

A problem of the conventional softbox is that the umbrella shaft extending between the fixed ring and the movable ring may affect the luminous effect or the reflection effect. The umbrella shaft needs to be designed to be elongated in shape for the movable ring to move up and down along the umbrella shaft, so that it restricts the installation position of the photographic lamp, and if the umbrella shaft is relatively long and partially located in front of the photographic lamp, shadows may be created to affect the final lighting effect.

SUMMARY OF THE PRESENT INVENTION

The invention is advantageous in that it provides a softbox light and a softbox lighting kit, when the softbox lighting kit is installed with a lighting element, a lighting effect of the lighting element is not adversely affected by the structure of the softbox lighting kit.

Another advantage of the present invention is to provide a softbox light and a softbox lighting kit which provides a fixed base and a movable base, wherein the lighting element can be installed on the fixed base, and by means of the movement of the movable base, the softbox lighting kit is able to shift between an opened state and a collapsed state, and the movable base will not adversely affect the light transmitting of the light beams from the lighting element.

Another advantage of the present invention is to provide a softbox light and a softbox lighting kit, wherein when the softbox lighting kit is in the opened state, the movable base is mounted on the fixed base to unfold a reflective cloth, and when the softbox lighting kit is in the collapsed state, the movable base is able to be detached from the fixed base.

Another advantage of the present invention is to provide a softbox light and a softbox lighting kit, wherein the engagement between the fixed base and the movable base is designed to be simple so as to facilitate the mounting and detaching of the movable base, and also the structure does not interfere the lighting effect of the lighting element installed on the fixed base.

Another advantage of the present invention is to provide a softbox light and a softbox lighting kit, wherein an opening degree of the reflective cloth of the softbox lighting kit can be adjusted, so as to provide varied lighting softening performances.

Another advantage of the present invention is to provide a softbox light and a softbox lighting kit, wherein the relative position between the fixed base and the movable base can be adjusted, so that the lighting softening performances of the softbox lighting kit can be adjusted by means of the varied relative position between the fixed base and the movable base.

Another advantage of the present invention is to provide a softbox light and a softbox lighting kit which comprises a main bracket and an auxiliary bracket, wherein the fixed base is provided on the main bracket, and the movable base is supported on the auxiliary bracket, by means of the design and configuration of the main bracket, the auxiliary bracket adn the fixed base, the movable base is able to be stably supported on the fixed base, and there is no need of a complicated structure of the engagement between the fixed base and the movable base.

Additional advantages and features of the invention will become apparent from the description which follows, and may be realized by means of the instrumentalities and combinations particularly pointing out in the appended claims.

According to the present invention, the foregoing and other objects and advantages are attained by a softbox lighting kit for installing a lighting element, comprising:
  a reflective cloth;
  a main bracket;
  a fixed base;
  a movable base; and
  an auxiliary bracket, wherein the main bracket is provided on the reflected cloth to allow the reflective cloth to be unfolded to form a box having a light outlet, wherein the main bracket is arranged on the fixed base and is extending around the fixed base, the auxiliary bracket is arranged on the movable base and is extending around the movable base, wherein the auxiliary bracket is connected between the movable base and the main bracket, wherein the movable base is movable with respect to the fixed base, wherein when the movable base is mounted and retained on the fixed base, the main bracket is unfolded by the auxiliary bracket to unfold the reflective cloth, wherein the lighting element is adapted to be installed on the movable base to project light beams to the reflective cloth.

According to an embodiment of the present invention, the softbox lighting kit further comprises a retaining member provided on the fixed base, wherein the fixed base comprises a mounting end and an opposite free end, wherein the mounting end of the fixed base is mounted to the reflective cloth, wherein the retaining member is configured to prevent the movable base to move toward the mounting end of the fixed base because of a push of the auxiliary bracket when the movable base is mounted on the fixed base.

According to an embodiment of the present invention, the softbox lighting kit further comprises a retaining member provided on the fixed base, wherein the fixed base comprises a mounting end and an opposite free end, wherein the mounting end of the fixed base is mounted to the reflective cloth, wherein the retaining member is configured to prevent the movable base to move toward the free end of the fixed base because of a push of the auxiliary bracket when the movable base is mounted on the fixed base.

According to an embodiment of the present invention, the fixed base comprises a mounting end and an opposite free end, wherein the mounting end of the fixed base is mounted to the reflective cloth, wherein a retaining groove is formed at the free end of the fixed base, so as to retain the movable base which is mounted to the free end of the fixed base.

According to an embodiment of the present invention, the auxiliary bracket comprises a plurality of connecting arms which is radially arranged on the movable base, wherein two ends of each of the connecting arms is pivotally connected to the main bracket and the movable base to allow movement of the movable base, wherein the main bracket comprises a plurality of support arms which is radially arranged on aid fixed base, wherein by means of the retaining element, each the support arm of the main bracket, each the connecting arm of the auxiliary bracket and the movable base retained on the fixed base form a triangular structure to stably unfold the reflective cloth.

According to an embodiment of the present invention, the main bracket has a central axis which pass through the fixed base and the movable base, wherein when the reflective cloth is unfolded, an include angle, which is an acute angle, is defined between the central axis and each of the connecting arms of the auxiliary bracket, wherein the retaining member is arranged between the movable base and the mounting end of the fixed base.

According to an embodiment of the present invention, the auxiliary bracket comprises a plurality of connecting arms which is radially arranged on the movable base, wherein two ends of each of the connecting arms is pivotally connected to the main bracket and the movable base to allow movement of the movable base, wherein the main bracket comprises a plurality of support arms which is radially arranged on aid fixed base, wherein by means of the retaining element, each the support arm of the main bracket, each the connecting arm of the auxiliary bracket and the movable base retained on the fixed base form a triangular structure to stably unfold the reflective cloth.

According to an embodiment of the present invention, the main bracket has a central axis which pass through the fixed base and the movable base, wherein when the reflective cloth is unfolded, an include angle, which is an obtuse angle, is defined between the central axis and each of the connecting arms of the auxiliary bracket, wherein the movable base is arranged between the retaining member and the mounting end of the fixed base.

According to an embodiment of the present invention, the retaining member is integrally formed with the fixed base, and the retaining member is formed on a peripheral surface of the fixed base.

According to an embodiment of the present invention, the retaining member is detachably mounted on the fixed base.

According to an embodiment of the present invention, the retaining member is arranged to surround the fixed base.

According to an embodiment of the present invention, the retaining member is screwed with the fixed base.

According to an embodiment of the present invention, the softbox lighting kit further comprises a retaining member provided on the fixed base and is set to be deformable, wherein the fixed base comprises a mounting end and a free end opposite to the mounting end, wherein when the movable base needs to be mounted, the retaining member is pressed to deform to allow the movable base to pass through, wherein when the movable base passes through the retaining member and is mounted to the fixed base, the retaining member automatically reset to prevent the movable base from being disengaged from the fixed base.

According to an embodiment of the present invention, the main bracket comprises a plurality of support arms radially and pivotally provided on the fixed base and extended toward the light outlet, wherein the support arms of the main bracket are allowed to be collapsed toward the fixed base, wherein the auxiliary bracket comprises a plurality of connecting arms which is radially arranged on the movable base, wherein each of the connecting arms of the auxiliary bracket is extended between the corresponding support arm of the main bracket and the fixed base.

According to an embodiment of the present invention, the fixed base has an installation cavity and an opening communicated to the installation cavity facing toward the light outlet, wherein the lighting element is adapted to be installed in the installation cavity through the opening.

According to an embodiment of the present invention, the fixed base comprised at least one electrical contact which is electrically connected to the lighting element when the lighting element is installed in the installation cavity of the fixed base.

According to an embodiment of the present invention, the movable base has a mounting groove, and the fixed base passes through the mounting groove of the movable base so as to allow the movable base to be sleeved on the fixed base.

According to an embodiment of the present invention, the movable base has a plurality of mounting slots intervally arranged along a periphery of the movable base, wherein the plurality of support arms is respectively pivotally engaged to the plurality of mounting slots.

According to an embodiment of the present invention, the fixed base has a plurality of accommodating slots intervally arranged along a periphery of the fixed base, wherein the plurality of connecting arms is respectively pivotally engaged to the plurality of accommodating grooves.

According to an embodiment of the present invention, the fixed base has a plurality of accommodating slots intervally arranged along a periphery of the fixed base, wherein the plurality of connecting arms is respectively pivotally engaged to the plurality of accommodating grooves, wherein the plurality of accommodating slots is respectively aligned with the plurality of mounting slots, so as to allow each the support arm of the main bracket mounted to the corresponding mounting slot and each corresponding connecting arm of the auxiliary bracket mounted to the corresponding accommodating slot to form a plane that is parallel to a central axis of the main bracket.

According to an embodiment of the present invention, the softbox lighting kit further comprises a light softening layer that is provided at a position corresponding to the light outlet of the reflective cloth.

The present invention further provides a softbox light which comprises a lighting element and a softbox lighting kit for installing the lighting element, wherein the softbox lighting kit comprises:
 a reflective cloth;
 a main bracket;
 a fixed base;
 a movable base; and
 an auxiliary bracket, wherein the main bracket is provided on the reflected cloth to allow the reflective cloth to be unfolded to form a box having a light outlet, wherein the main bracket is arranged on the fixed base and is extending around the fixed base, the auxiliary bracket is arranged on the movable base and is extending around the movable base, wherein the auxiliary bracket is connected between the movable base and the main bracket, wherein the movable base is movable with respect to the fixed base, wherein when the movable base is mounted and retained on the fixed base, the main bracket is unfolded by the auxiliary bracket to unfold the reflective cloth, wherein the lighting element is adapted to be installed on the movable base to project light beams to the reflective cloth.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
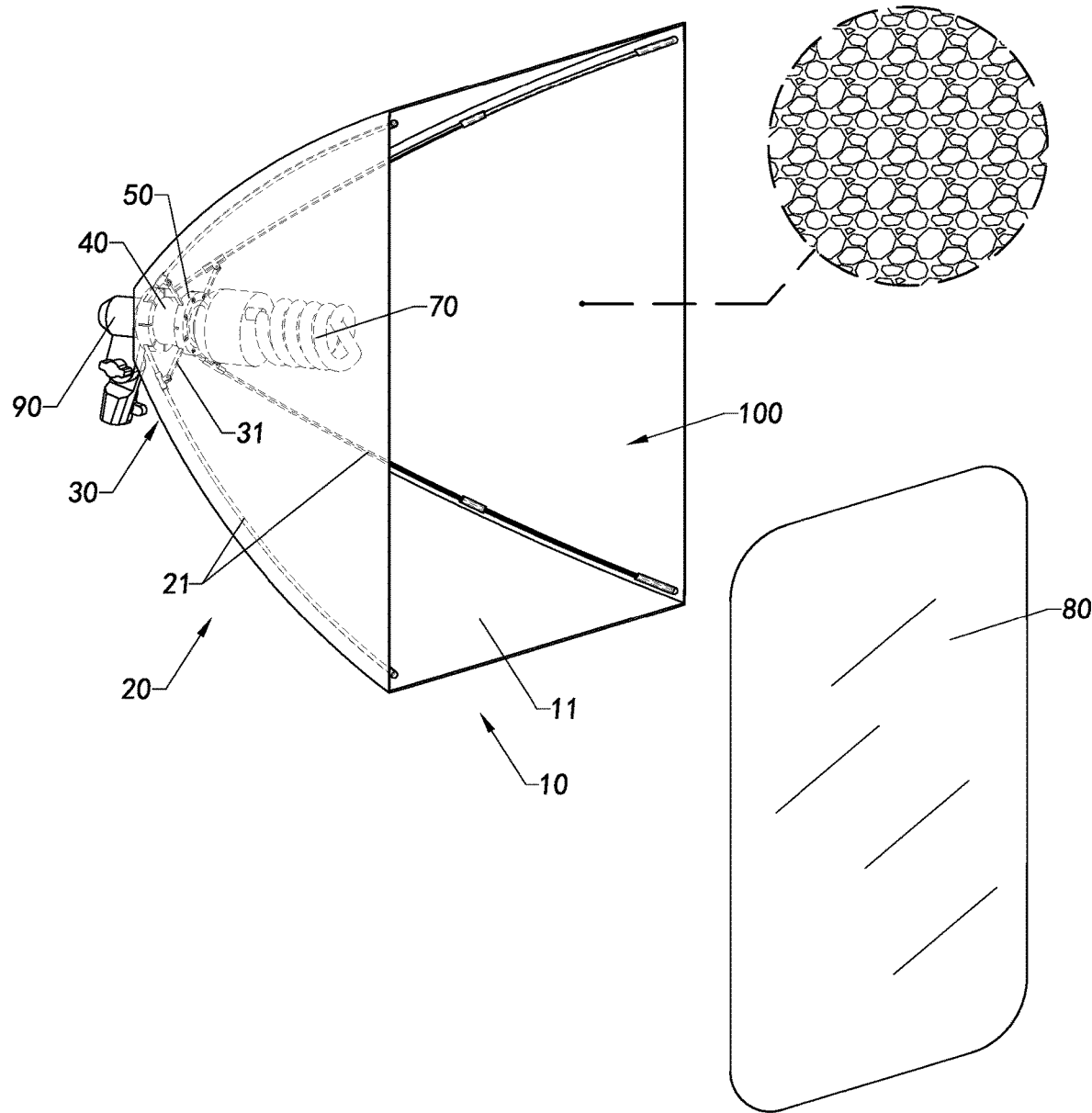
FIG. 1A is a perspective view of a softbox lighting kit according to a preferred embodiment of the present invention.
Figure 1B:
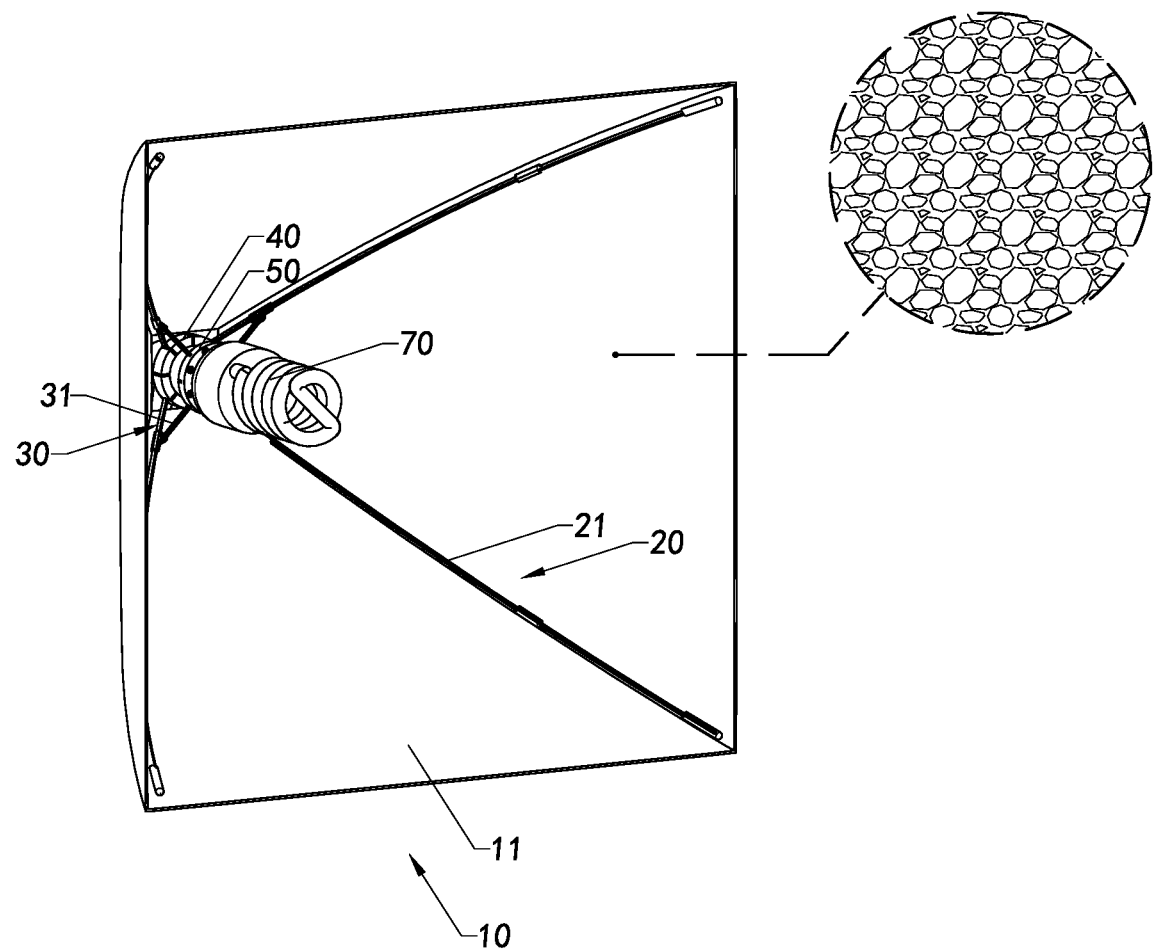
FIG. 1B is an another perspective view of the softbox lighting kit according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIGS. 1A to 5B, a softbox lighting kit according to a preferred embodiment of the present invention is illustrated, the softbox lighting kit is adapted to be opened or collapsed but does not require a umbrella shaft in a conventional softbox. When a lighting element 70 such as a lamp or a lighting bulb is installed on the softbox lighting kit, the adverse effect of the structure of the softbox lighting kit to the lighting effect of the lighting element 70 is reduced so as to allow the softbox lighting kit to provide an enhanced light softening performance.

More specifically, the softbox lighting kit comprises a reflective cloth 10 having a light outlet 100, a main bracket 20, an auxiliary bracket 30, a fixed base 40 and a movable base 50. The reflective cloth 10 has a reflective surface 11, and the light beams emitted by the lighting element 70 will project to the reflective surface 11 of the reflective cloth 10 and will be reflected by the reflective surface 11, and then the light beams will radiate outward through the light outlet 100. Accordingly, light beams from the lighting element 70 can be softened by the softbox lighting kit of the present invention.

The fixed base 40 is arranged on the reflective cloth 10 and is suitable for being arranged at a middle position of the reflective cloth 10. The main bracket 20 is disposed to extend forward from the fixed base 40 and is extended toward the light outlet 100, the reflective cloth 10 is arranged on the main bracket 20.

The main bracket 20 can be collapsed or opened, when the main bracket 20 is opened, the reflective cloth 10 can form a box having the light outlet 100. In other words, the reflective cloth 10 can be stretched into a box shape to soften the light beams of the lighting element 70.

The movable base 50, which is used for mounting the lighting element 70, is adapted to be mounted to the fixed base 40. When the reflective cloth 10 needs to be collapsed, the movable base 50 can be detached from the fixed base 40 to allow the reflective cloth 10 to be collapsed and folded. When the reflective cloth 10 needs to be opened, the movable base 50 can be installed on the fixed base 40 to allow the reflective cloth 10 to be stretched and unfolded. After the reflective cloth 10 is stretched, the fixed base 40, the movable base 50, the main bracket 20 and the auxiliary bracket 30 will not have adverse effects on the reflection of light. The light beams emitted from the lighting element 70 can radiate outward as uniformly as possible to produce an enhanced soft lighting effect.

Specifically, the auxiliary bracket 30 is used to support the movable base 50 on the main bracket 20 in such a manner that the movable base 50 can be suspended from the fixed base 40 under the support of the auxiliary bracket 30. The auxiliary bracket 30 is movably connected to the main bracket 20 and the movable base 50, so as to allow the movement of the movable base 50.

The auxiliary bracket 30 is radially arranged from the movable base 50, the main brackets 20 is radially arranged from the fixed base 40, and the movable base 50 is supported on the main bracket 20 by the auxiliary bracket 30. When the movable base 50 is moved to be fixedly installed on the fixed base 40, the auxiliary bracket 30 moves along with the movable base 50 and the auxiliary bracket 30 unfolds the main bracket 20 to be in the opened state. When the movable base 50 is detached from the fixed base 40, the auxiliary bracket 30 moves along with the movable base 50 and the auxiliary bracket 30 is collapsed so that the main bracket 20 is also collapsed.

Figure 2:
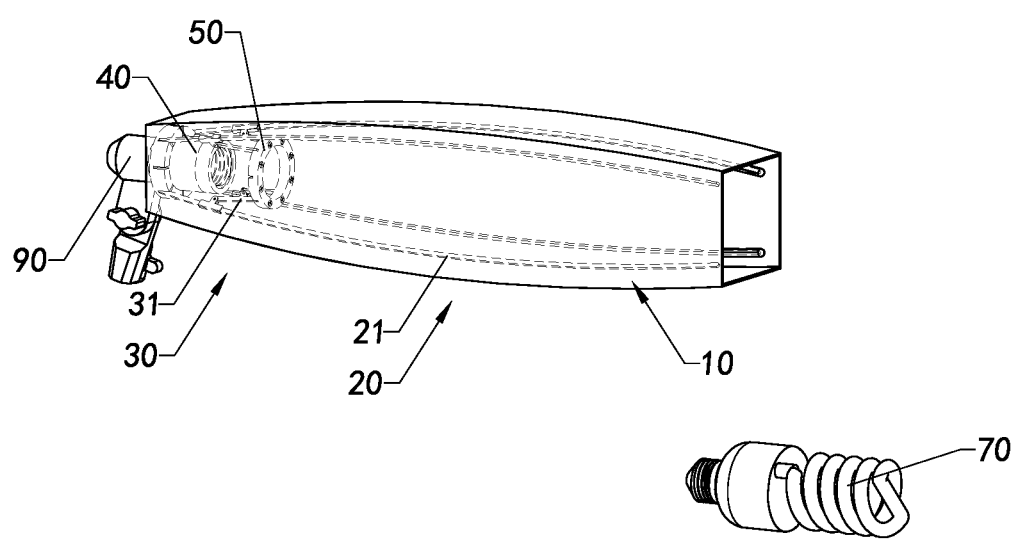
FIG. 2 is a perspective view of the softbox lighting kit in a collapsed state according to the above preferred embodiment of the present invention.
Figure 3:
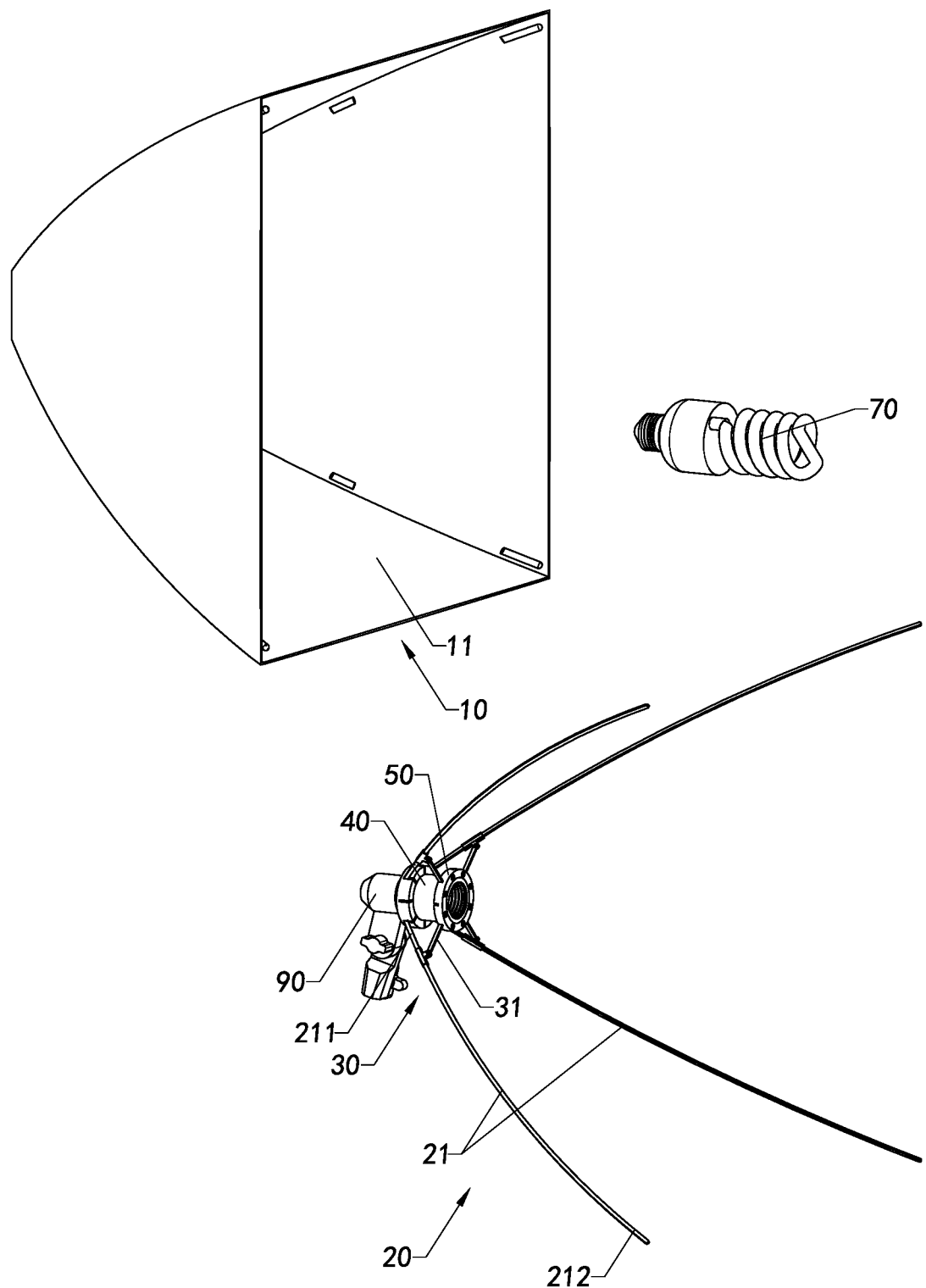
FIG. 3 is an exploded view of the softbox lighting kit in a collapsed state according to the above preferred embodiment of the present invention.

In other words, by adjusting the relative position between the movable base 50 and the fixed base 40, the softbox lighting kit can be switched between the opened state and the collapsed state. Referring to FIG. 1A, in the opened state, the reflective cloth 10 of the softbox lighting kit is stretched to reflect light smoothly. Referring to FIG. 2 of the drawings, in the collapsed state, the reflective cloth 10 of the softbox lighting kit is collapsed.

The lighting element 70 is adapted to be mounted on the movable base 50 and arranged to face toward the light outlet 100. After the softbox lighting kit is opened, the fixed base 40 and the movable base 50 are respectively located behind the radiation direction of the lighting element 70. In other words, the light beams from the lighting element 70 will not be affected by the fixed base 40 or the movable base 50 located behind the lighting element 70. In addition, the auxiliary bracket 30 is arranged to be extended between the main bracket 20 and the movable base 50. For the lighting element 70 installed on the movable base 50, the auxiliary bracket 30 arranged radially around the movable base 50 and the auxiliary bracket 30 radially arranged around the fixed base 40 also does not adversely affect the light beams radiated from the lighting element 70. Therefore, for the softbox lighting kit of the present invention, operating on the movable base 50 and the fixed base 40 will shift the softbox lighting kit between the opened state and the collapsed state without causing too much adverse interference to the soft lighting effect.

More specifically, the main bracket 20 comprises a plurality of support arms 21, such as three, four, five or more support arms 21. In this embodiment, the number of the support arms 21 is four as an example for description. Each of the support arms 21 is arranged to be extended forward from the fixed base 40, that is, toward the light outlet 100. The two adjacent support arms 21 are arranged to maintain a predetermined interval. In this example, the main bracket 20 is set to be similar to the skeleton of an umbrella, and a predetermined angle is maintained between the two adjacent support arms 21. Specifically, each of the support arms 21 has a connecting end 211 and an opposite extending end 212, wherein the connecting end 211 of the corresponding support arm 21 is connected to the fixed base 40, distances between the two adjacent arms 21 is set to be larger and larger from the connection ends 211 to the extending ends 212. When the softbox lighting kit is in the opened state, each of the support arms 21 is arranged to be extending outward and forward from the fixed base 40. When the softbox lighting kit is in the collapsed state, the extending ends 212 of the support arms 21 can be moved to be close to each other, so that the support arms 21 of the entire main bracket 20 can be closed to each other, so as to be collapsed and folded.

The auxiliary bracket 30 comprises a plurality of connecting arms 31, such as three, four, five or more connecting arms 31. In this embodiment, the number of the connecting arms 31 is four as an example for description. Preferably, one of the connecting arms 31 of the auxiliary bracket 30 corresponds to one of the support arms 21 of the main bracket 20. That is, each of the support arms 21 of one of the main bracket 20 is supported by the corresponding connecting arm 31 of the auxiliary bracket 30 to maintain a predetermined distance from the movable base 50. When the connecting arms 31 of the auxiliary bracket 30 are folded, each support arm 21 of the main bracket 20 can be brought closer to the movable base 50, so that the entire softbox lighting kit is folded into a bundle shape.

Furthermore, the main bracket 20 has a central axis A, and the central axis A passes through a virtual connection point of extending lines of the connecting ends 211 of the support arms 21 of the main bracket 20 which are extending along the length direction, the included angle between each of the support arms 21 and the central axis A is the same. Preferably, the central axis A of the main bracket 20 passes through a center of the auxiliary bracket 30, so that the connecting arms 31 of the auxiliary bracket 30 are symmetrically surrounded the central axis A of the main bracket 20.

The central axis A of the main bracket 20 is similar to an umbrella axis of the softbox lighting kit, but is a virtual axis. When the softbox lighting kit is being opened or collapsed, the fixed base 40 and the movable base 50 are always kept along the central axis A, wherein the movable base 50 is arranged to be able to move along the axis A until the movable base 50 is mounted on the fixed base 40. When the movable base 50 is fixedly installed on the fixed base 40, the fixed base 40 and the movable base 50 are arranged along the central axis A of the main bracket 20, each of the support arms 21 of the main bracket 20 is unfolded and put up by the corresponding connecting arms 31 of the auxiliary bracket 30, and in return, the support arms 21 further retain the movable base 50 in position by reaction forces from the support arms 21. As for the movable base 50, the movable base 50 itself has a tendency to be separated from the fixed base 40, so that keeping the movable base 50 and the fixed base 40 on the same straight line can be beneficial to the fixed base 40 for fixing the movable base 50 to prevent the movable base 50 to outwardly move.

Figure 4:
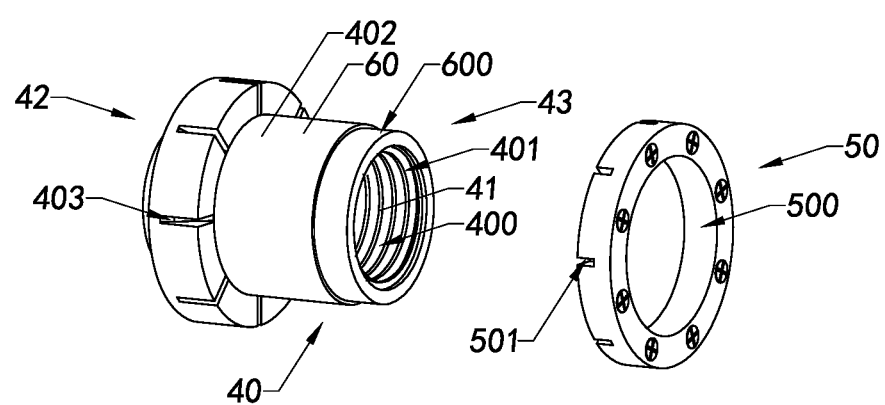
FIG. 4 is a perspective view illustrating a fixed base and a movable base of the softbox lighting kit according to the above preferred embodiment of the present invention.

Furthermore, referring to FIG. 4, the fixed base 40 forms an installation cavity 400 and is provided with at least one electrical contact 41, wherein the lighting element 70 is suitable for being installed in the installation cavity 400 of the fixed base 40 to have contact with the electrical contact 41 that is adapted to conduct electricity. Accordingly, when the lighting element 70 is installed on the fixed base 40, the power supply of the lighting element 70 can be transmitted through the electrical contact 41. The electrical contact 41 may be arranged in a ring shape to facilitate electrical conduction between the lighting element 70 and an external electrical energy source.

The lighting element 70 can be installed in the installation cavity 400 through an opening 401 of the installation cavity 400. Furthermore, the movable base 50 has a mounting groove 500, and the fixed base 40 passes through the mounting groove 500 of the movable base 50 so that the movable base 50 is sleeved on the fixed base 40. The inner perimeter of the cross-section of the mounting groove 500 of the movable base 50 is matched with the outer perimeter of the cross-section of the fixed base 40, so that the movable base 50 can be retained at the fixed base 40. In this embodiment, the mounting groove 500 is configured to be circular, and the movable base 50 is configured to be annular. The fixed base 40 is provided in a cylindrical shape. Of course, those skilled in the art can understand that the mounting groove 500 can also be implemented in a triangle, a quadrangle, a pentagon or other shapes, as long as the cross-sectional periphery of the fixed base 40 is set to be the same as the installation slot 500.

It is worth mentioning that it is not necessary to perform complicated operations on the movable base 50 and the fixed base 40 for the softbox lighting kit to change between the opened state and the collapsed state. In the opened state, the movable base 50 being retained at the fixed base 40 does not depend on the firm connection between the movable base 50 and the fixed base 40, but rather depends on the entire layout of the softbox lighting kit comprising the main bracket 20, the auxiliary bracket 30, the fixed base 40 and the movable base 50, and the entire softbox lighting kit is also can be kept in a stable configuration.

Specifically, when the movable base 50 connected to the connecting arms 31 of the auxiliary bracket 30 moves toward the fixed base 40 to a preset position that the movable base 50 is sleeved on the fixed base 40, the movable base 50 is arranged around the fixed base 40, and the mounting groove 500 of the movable base 50 is set to be slightly larger than the cross section of the fixed base 40, so that the relative leftward and rightward movement of the movable base 50 with respect to the fixed base 40 is prevented.

If the connecting arms 31 of the auxiliary bracket 30 or the support arms 21 of the main bracket 20 are not symmetrically arranged, or the movable base 50 or the fixed base 40 is constructed to be an asymmetric structure. Each position of the movable base 50 tends to move left and right due to uneven force, but due to the restricting effect of the fixed base 40, the leftward and rightward movement of the movable base 50 sleeved on the fixed base 40 is restricted.

In addition, the support arms 21 of the main bracket 20 that are unfolded and stretched have a tendency to move toward the inner side, so that they exert forces on the connecting arms 31 of the auxiliary bracket 30, so as to transmit the force to the movable base 50 that is connected to the connecting arms 31 of the auxiliary bracket 30. That is to say, the movement of the movable base 50 is mainly limited by the fixed base 40 and the auxiliary bracket 30, and the fixed base 40 restricts and prevents the leftward and rightward movement of the movable base 50 with respect to the fixed base 40.

Alternatively, the length of each of the connecting arms 31 of the auxiliary bracket 30 is designed so that when the movable base 50 is retained and installed on the fixed base 40, all of the connecting arms 31 of the auxiliary bracket 30 are located in a same plane or approximately in a same plane, so that the outward pushing forces of the connecting arms 31 of the auxiliary bracket 30 on the movable base 50 can offset, so that the movable base 50 can be stably installed on the fixed base 40, and the movable base 50 will not be pushed away from the fixed base 40 by the connecting arms 31 of the auxiliary bracket 30 after a force exerted by a user on the movable base 50 disappears.

Figure 5A:
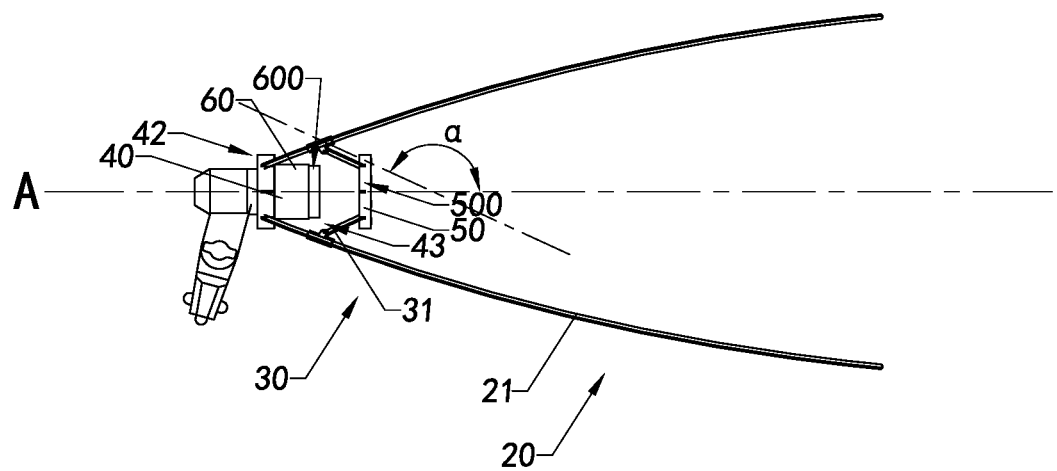
FIG. 5A is a schematic view illustrating the softbox lighting kit in an application state according to the above preferred embodiment of the present invention.
Figure 5B:
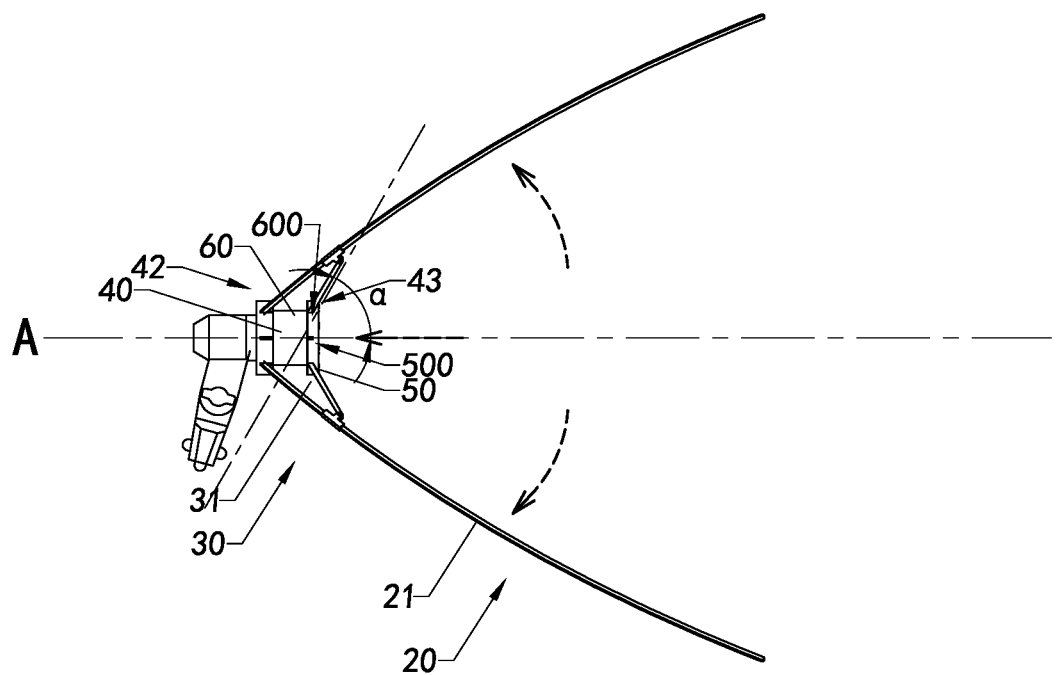
FIG. 5B is a schematic view illustrating the softbox lighting kit in an another application state according to the above preferred embodiment of the present invention.

In this embodiment, as shown in FIG. 5B, in the opened state, an included angle α toward the light outlet 100 is formed between each of the connecting arms 31 of the auxiliary bracket 30 and the central axis of A the main bracket 20, wherein the included angle α is set to be no more than 90°, which can be 90° or an acute angle.

In this embodiment, the included angle α can be implemented as an acute angle, such as 80°, and the connecting arms 31 are implemented as arms extending forward and outward from the movable base 50. In this case, the force of the support arms 21 of the main bracket 20 is transmitted to the corresponding connecting arms 31 of the auxiliary bracket 30, and the inclined connecting arms 31 have the tendency of driving the movable base 50 to move close the fixed base 40. In other words, under the action of the connecting arms 31, the movable base 50 is retained and maintained on the fixed base 40.

Furthermore, the fixed base 40 is provided with a retaining member 60 which is provided on a peripheral surface 402 of the fixed base 40. The fixed base 40 has a mounting end 42 and an opposite free end 43, the mounting end 42 is suitable for being installed on the reflective cloth 10, wherein the movable base 50 is suitable for passing through the free end 43 of the fixed base 40, so as to be mounted on the fixed base 40, and the retaining member 60 is disposed close to the free end 43. When mounting the movable base 50 to the fixed base 40, under the push of the connecting arms 31, the movable base 50 can naturally move toward the mounting end 42 of the fixed base 40 until it moves to the position corresponding to the retaining member 60 on the fixed base 40, and then the movable base 50 is limited and retained by the retaining member 60. The retaining member 60 is protruded from the peripheral surface 402 of the fixed base 40 to limit the movement of the movable base 50. Alternatively, the retaining member 60 may be integrally formed with the fixed base 40, or may be detachably connected to the fixed base 40. For example, the surface of the fixed base 40 may be formed with threads, and the limiter 60 can be detachably screwed to the fixed base 40 and the user can select the coupling position of the limiter 60 on the fixed base 40 according to requirements, so that the position of the movable base 50 retained on the fixed base 40 can be selected, so as to control the unfolding and opening degree and configuration of the reflective cloth 10.

It can be understood that when the retaining member 60 is movably installed on the fixed base 40, the connection between the retaining member 60 and the fixed base 40 may be screw connection, snap connection or another positionable detachable connections.

In this embodiment, the retaining member 60 is integrally formed on the fixed base 40. When the movable base 50 moves to the position where the retaining member 60 is located, it is blocked and cannot continue to move toward the mounting end 42 of the fixed base 40.

Furthermore, the fixed base 40 forms a retaining groove 600, the peripheral surface 402 of the fixed base 40 is extended between the mounting end 42 and the free end 43, and at least a portion of the peripheral surface 402 is indented to form the retaining groove 600. The movable base 50 being pushed from the free end 43 of the fixed base 40 and mounted at the fixed base 40 is adapted to be limited at the retaining groove 600. Alternatively, the retaining member 60 is a circular step, and the retaining groove 600 is a circular groove.

In the above manner, the connection between the movable base 50 and the fixed base 40 does not need to rely on other complicated matching methods, and the movable base 50 can be stably retained on the fixed base 40. During use, on one hand, the movable base 50 is difficult to move toward the direction close to the mounting end 42 of the fixed base 40 due to the limiting effect of the retaining member 60, and on the other hand, the movable base 50 is difficult to move away from the fixed base 40 due to the pressing action of the connecting arms 31, so that the movable base 50 can be stably mounted on the fixed base 40. When the user needs to collapse the softbox lighting kit, an external force can be applied to move the movable base 50 away from the fixed base 40 until the movable base 50 is separated from the fixed base 40, so that the support arms 21 of the main bracket 20 are folded, so that the connecting arms 31 can be freely moved, and the movement of the movable base 50 will not be restricted by the connecting arms 31.

In addition, the movable base 50 is formed with a plurality of mounting slots 501, the mounting slots 501 are arranged at intervals along the periphery of the movable base 50, and one end of each of the connecting arms 31 is accommodated in the corresponding mounting slot 501 and each of the connecting arms 31 is pivotally mounted on the movable base 50. The left and right movement of each of the connecting arms 31 is restricted by the movable base 50 and the movable base 50 allows the connecting arms 31 to pivotally rotate up and down within a predetermined range. In this embodiment, one of the mounting slots 501 is installed with one of the connection arms 31.

Similarly, the fixed base 40 forms a plurality of accommodating slots 403, wherein the accommodating slots 403 are arranged at intervals along the periphery of the fixed base 40, and one end of each of the support arms 21 is accommodated in the corresponding accommodating slot 403, and the support arms 21 are pivotally mounted on the fixed base 40. The left and right movement of the support arms 21 are restricted by the fixed base 40 and the fixed base 40 allows the support arms 21 to pivotally rotate up and down within a predetermined range, so as to allow the main bracket 20 to be unfolded or collapsed. In this embodiment, one of the support arms 21 is installed to one of the receiving openings 403.

Furthermore, the mounting slots 501 of the movable base 50 may be aligned with the accommodating slots 403 of the fixed base 40, so that in the opened state, each connecting arm 31 that is mounted to the mounting slot 501 of the movable base 50 and each corresponding support arm 21 that is mounted to the accommodating slot 403 of the fixed base 40 form a plane that is parallel to the central axis A, so as to facilitate that each support arm 21 of the main bracket 20, the corresponding connecting arm 31 of the auxiliary bracket 30, and the fixed base 40 on which the movable base 50 is installed to form a relatively stable triangular support structure.

Figure 6:
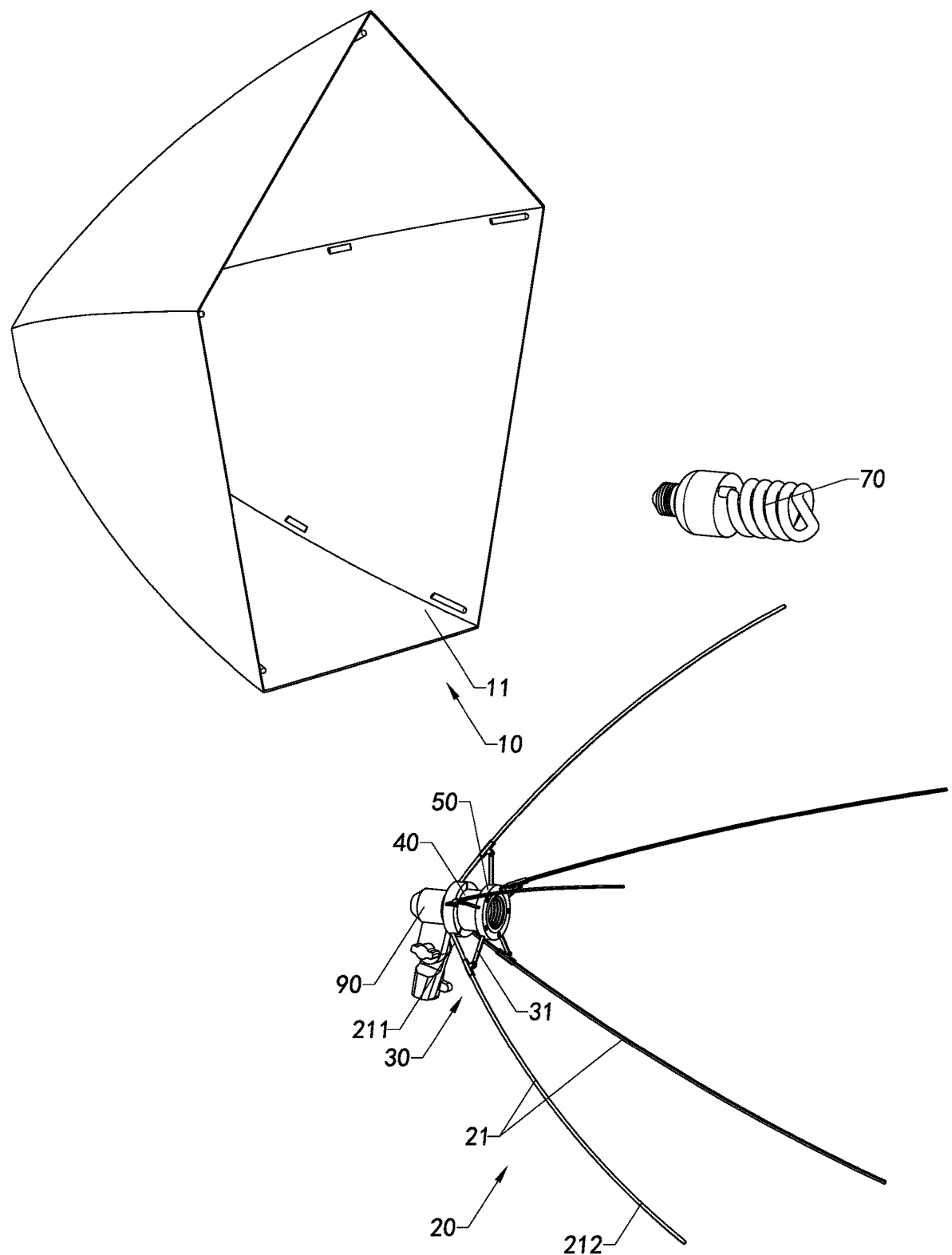
FIG. 6 is an exploded view of a softbox lighting kit according to a first alternative mode of the above preferred embodiment of the present invention.
Figure 7:
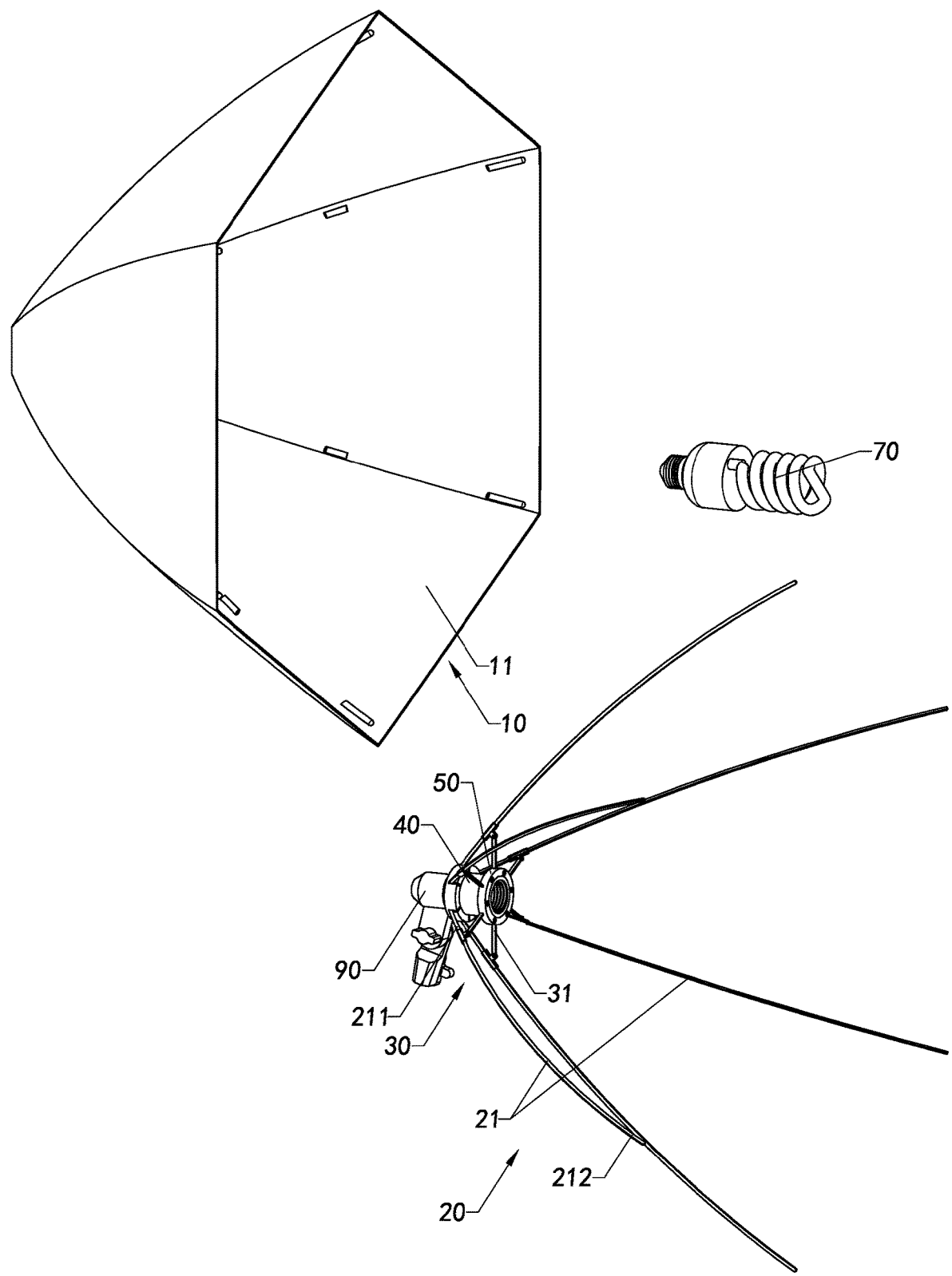
FIG. 7 is an exploded view of a softbox lighting kit according to a second alternative mode of the above preferred embodiment of the present invention.

In this embodiment, the number of the support arms 21 of the main bracket 20 is four, the number of the connecting arms 31 of the auxiliary bracket 30 is four, the number of the accommodating slot 403 of the fixed base 40 is four, and the number of the mounting slots 501 of the movable base 50 is four. The light outlet 100 of the softbox lighting kit is arranged to have a rectangular profile, such as square shape. Those skilled in the art can understand that the number of the support arms 21 of the main bracket 20, the number of the connecting arms 31 of the auxiliary bracket 30, the number of the accommodating slots 403 of the fixed base 40 and the number of the mounting slots 501 of the movable base 50 can be adjusted according to requirements. For example, referring to FIG. 6 and FIG. 7, the other two alternative modes of the softbox lighting kit according to the above preferred embodiment of the present invention are illustrated. In the embodiment shown in FIG. 6, the number of the support arms 21 of the main bracket 20 is five, the number of the connecting arms 31 of the auxiliary support 30 is five, and the light outlet 100 is arranged to have a pentagonal shape. In the embodiment shown in FIG. 7, the number of the support arms 21 of the main bracket 20 is six, the number of the connecting arms 31 of the auxiliary support 30 is six, and the light outlet 100 is arranged to be hexagonal.

Further, the softbox lighting kit comprises a light softening layer 80 which is installed at the position corresponding to the light outlet 100 to soften the light beams that will leave the softbox lighting kit. The light softening layer 80 may be a thin paper or a light permeable film layer made of plastic material.

The softbox lighting kit may further comprise a support base 90, wherein the fixed base 40 may be arranged on the support base 90, and the support base 90 is suitable for supporting the reflective cloth 10, the main bracket 20, the auxiliary bracket 30, the fixed base 40 and the movable base 50. With the support base 90, the softbox lighting kit can be mounted on a support rod, so as to be supported at a preset height.

Figure 8:
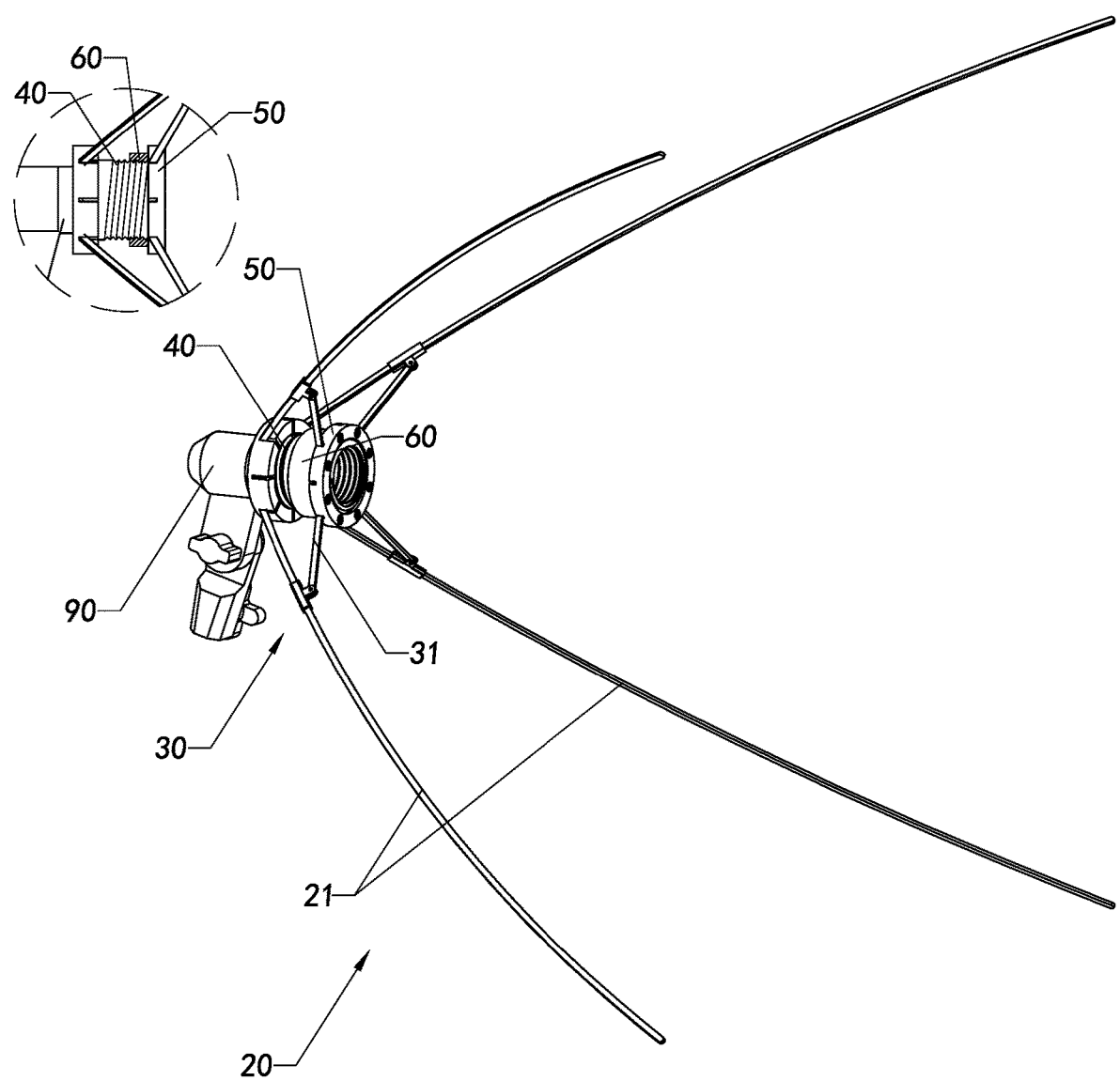
FIG. 8 is a perspective view illustrating an engagement between a limiting member, a fixed base and a movable base of a softbox lighting kit according to a third alternative mode of the above preferred embodiment of the present invention.

Referring to FIG. 8, and referring to FIGS. 1A to 5B at the same time, a part of the softbox lighting kit according to a third alternative mode of the above preferred embodiment of the present invention is illustrated. The softbox lighting kit of this embodiment comprises the reflective cloth 10, the main bracket 20, the auxiliary bracket 30, the fixed base 40 and the movable base 50. The main bracket 20 comprises a plurality of the support arms 21, and the auxiliary bracket 30 comprises a plurality of the connecting arms 31. The fixed base 40 is provided with the retaining member 60.

The difference between this embodiment and the above mentioned embodiment mainly lies in the retaining member 60. In the above embodiment, the retaining member 60 is integrally formed on the fixed base 40, and the movable base 50 is retained in position by the retaining member 60 after the movable base 50 is mounted on the fixed base 40.

In this embodiment, the retaining member 60 is movable and can retain its position on the fixed base 40 after being moved, so that the fixed position between the movable base 50 and the fixed base 40 can be adjusted. More specifically, at least part of the peripheral surface 402 of the fixed base 40 is provided with threads, and the retaining member 60 is screwed to the fixed base 40. By adjusting the relative position between the retaining member 60 and the fixed base 40, the position of the movable base 50 can be adjusted, so that the opening degree of the softbox lighting kit can be adjusted within a predetermined range, and the size of the light outlet 100 of the softbox lighting kit and the reflective angle of the reflective cloth 10 can be adjusted.

Figure 9:
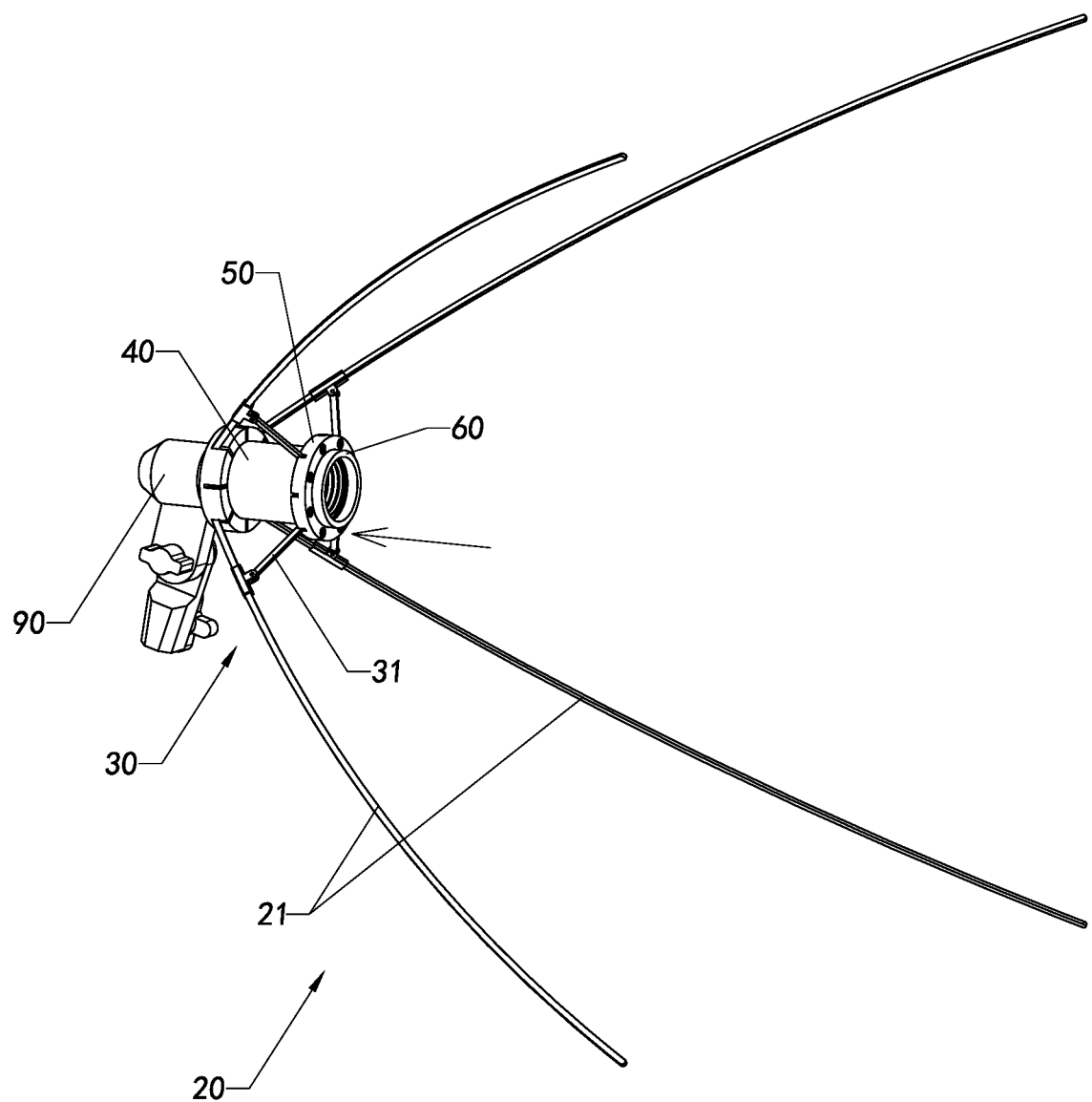
FIG. 9 is a perspective view illustrating an engagement between a limiting member, a fixed base and a movable base of a softbox lighting kit according to a fourth alternative mode of the above preferred embodiment of the present invention.

Referring to FIG. 9, and referring simultaneously to FIGS. 1A to 5B, a softbox lighting kit according to a fourth alternative mode of the above preferred embodiment of the present invention is illustrated. The softbox lighting kit of this embodiment comprises the reflective cloth 10, the main bracket 20, the auxiliary bracket 30, the fixed base 40 and the movable base 50. The main bracket 20 comprises a plurality of the support arms 21, and the auxiliary bracket 30 comprises a plurality of the connecting arms 31.

The difference between this embodiment and the above mentioned preferred embodiment mainly lies in the arrangement position of the retaining member 60. In the above embodiment, the retaining member 60 is disposed between the movable base 50 and the mounting end 42 of the fixed base 40 to prevent the movable base 50 from continuing to move toward the mounting end 42 of the fixed base 40. In this embodiment, the retaining member 60 is disposed at an outer side of the movable base 50, that is, the movable base 50 is located between the retaining member 60 and the mounting end 42 of the fixed base 40.

Specifically when the softbox lighting kit is folded and collapsed, the support arms 21 of the main bracket 20 and the connection arms 31 of the auxiliary bracket 30 are in a nearly parallel state. The connecting arms 31 of the auxiliary bracket 30 and the central axis A are in a nearly parallel state. When the softbox lighting kit needs to be opened, the movable base 50 moves from a position away from the fixed base 40 toward the direction close to the mounting end 42 of the fixed base 40. Each of the connecting arms 31 of the auxiliary bracket 30 and the central axis A defines the included angle α gradually decreasing from the nearly 180 degrees. When the included angle α reaches a preset angle, the softbox lighting kit is fully opened and unfolded, and the retaining member 60 is installed from the side of the free end 43 of the fixed base 40 to prevent the movable base 50 to move in a direction away from the mounting end 42 of the fixed base 40, thereby maintaining the softbox lighting kit in the open position.

It can be understood that, in the opened state, the included angle α formed by each of the connecting arms 31 of the auxiliary bracket 30 and the central axis A may be 90° or an obtuse angle, so that the movable base 50 has a tendency to move away from the fixed base 40 to come off the fixed base 40. In other words, at this time, the movable base 50 has a tendency to move outward to make the softbox lighting kit be tend to collapse. In the previous embodiment, without the retaining member 60, the movable base 50 would have a tendency to move inward to make the softbox lighting kit be tend to collapse.

Furthermore, the retaining member 60 is detachably mounted on the fixed base 40. When the movable base 50 is required to move to make the softbox lighting kit be change between from the opened state to the collapsed state, the retaining member 60 is detached from the fixed base 40. When the softbox lighting kit needs to be kept in the opened state, the retaining member 60 is mounted on the fixed base 40. In this embodiment, the retaining member 60 is detachably clamped to the fixed base 40, for example, the retaining member 60 may be provided with a protrusion, and the fixed base 40 may be provided with a concave slot, and the snap connection between the retaining member 60 and the fixed base 40 is realized by the mutual cooperation of the protrusion and the groove.

Figure 10:
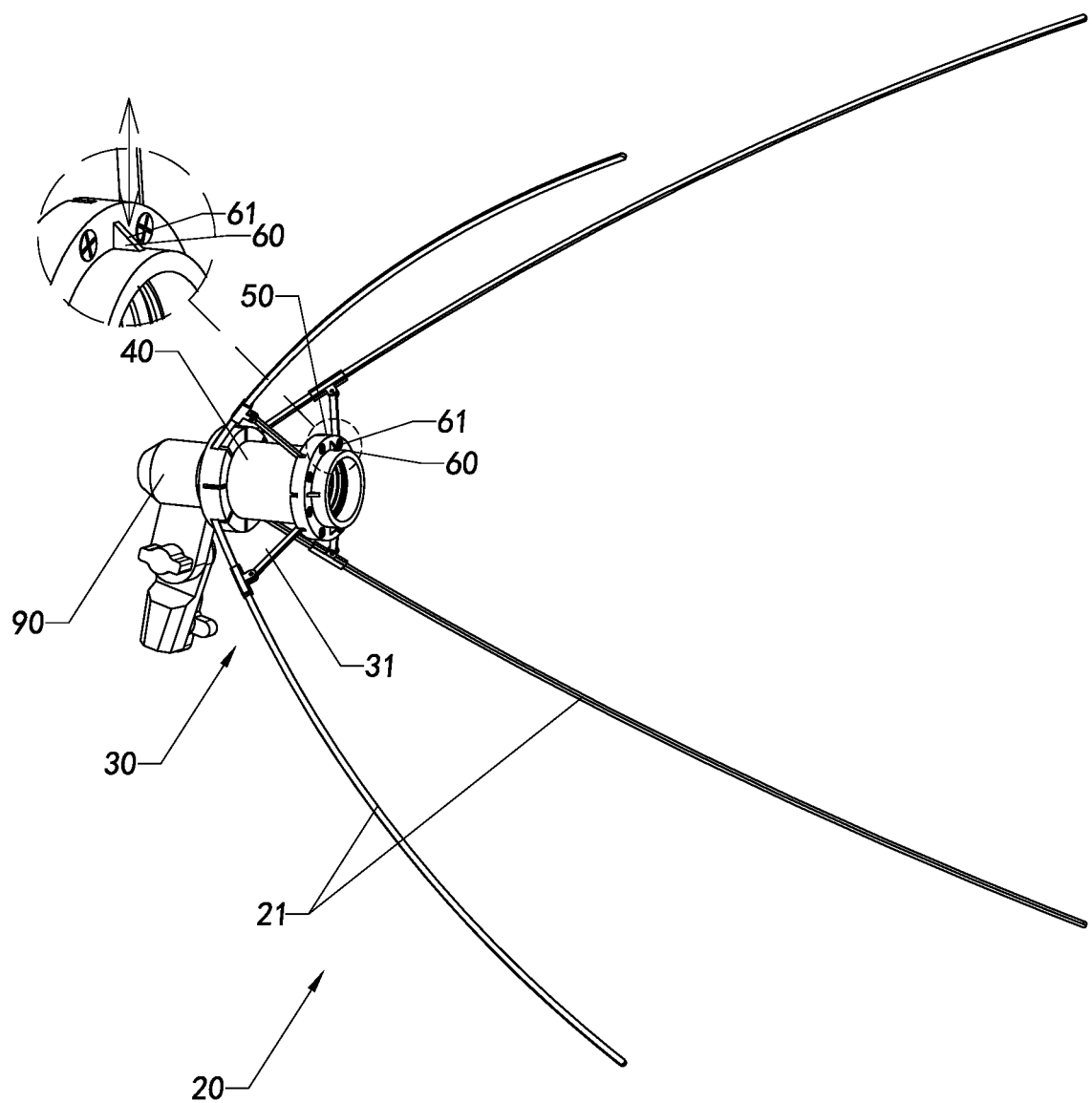
FIG. 10 is a perspective view illustrating an engagement between a limiting member, a fixed base and a movable base of a softbox lighting kit according to a fifth alternative mode of the above preferred embodiment of the present invention.

Referring to FIG. 10, and with reference to FIGS. 1A to 5B simultaneously, the softbox lighting kit according to a fifth alternative mode of the above preferred embodiment of the present invention is illustrated. The softbox lighting kit of this embodiment comprises the reflective cloth 10, the main bracket 20, the auxiliary bracket 30, the fixed base 40 and the movable base 50. The main bracket 20 comprises a plurality of the support arms 21, and the auxiliary bracket 30 comprises a plurality of the connecting arms 31.

In this embodiment, the retaining member 60 is set to be deformable, and the movable base 50 can be retained between the mounting end 42 of the fixed base 40 and the retaining member 60. When the movable base 50 needs to be mounted, the retaining member 60 can be pressed to allow the movable base 50 to pass through. When the movable base 50 passes through the retaining member 60 and is installed, the retaining member 60 can automatically return to the original position to prevent the movable base 50 from being disengaged from the fixed base 40.

More specifically, the retaining member 60 is provided with an elastic member, by means of the elastic member, the retaining member 60 is movably arranged on the fixed base 40 and the retaining member 60 can automatically reset. The elastic member may be a spring or an elastic sheet. When the elastic member is in a natural state, the retaining member 60 is pushed out by the elastic member to protrude from the fixed base 40. When the elastic member is pressed, the retaining member 60 can not be higher than the fixed base 40 so that the movable base 50 can pass through the retaining member 60 and be retained on the fixed base 40.

The retaining member 60 has a retaining inclined surface 61, wherein the retaining inclined surface 61 is set to be inclined, and the inclined direction is that the side close to the free end 43 of the fixed base 40 is lower than the side close to the mounting end 42 of the fixed base 40. When the movable base 50 needs to be retained on the fixed base 40 and encounters the retaining member 60, the movable base 50 moves inward along the lower side of the retaining inclined surface 61, and naturally press down the retaining inclined surface 61, so as to move to a position between the retaining member 60 and the mounting end 42 of the fixed base 40. After the movable base 50 leaves the retaining member 60, the retaining member 60 is automatically reset with the assistance of the elastic member to prevent the movable base 50 from coming out.

It can be understood that the retaining member 60 is arranged on the peripheral side of the installation cavity 400 of the fixed base 40, and when the lighting element 70 is installed in the installation cavity 400 of the fixed base 40. After that, the retaining member 60 is located behind the lighting element 70, so the retaining member 60 and the fixed base 40 will not affect the lighting effect of the lighting element 70.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A softbox lighting kit for installing a lighting element, comprising:
   a reflective cloth;
   a main bracket;
   a fixed base;
   a movable base;
   an auxiliary bracket, wherein said main bracket is provided on said reflected cloth to allow said reflective cloth to be unfolded to form a box having a light outlet, wherein said main bracket is arranged on said fixed base and is extending around said fixed base, said auxiliary bracket is arranged on said movable base and is extending around said movable base, wherein said auxiliary bracket is connected between said movable base and said main bracket, wherein said movable base is movable with respect to said fixed base, wherein when said movable base is mounted and retained on said fixed base, said main bracket is unfolded by said auxiliary bracket to unfold said reflective cloth, wherein the lighting element is adapted to be installed on said movable base to project light beams to said reflective cloth; and a retaining member provided on said fixed base, wherein said fixed base comprises a mounting end and a free end opposite to said mounting end, wherein said mounting end of said fixed base is mounted to said reflective cloth, wherein said retaining member is configured to prevent said movable base to move toward said mounting end of said fixed base because of a push of said auxiliary bracket when said movable base is mounted on said fixed base;

wherein said fixed base comprises a mounting end and a free end opposite to said mounting end, wherein said mounting end of said fixed base is mounted to said reflective cloth, wherein a retaining groove is formed at said free end of said fixed base, so as to retain said movable base which is mounted to said free end of said fixed base.

2. A softbox lighting kit for installing a lighting element, comprising:
 a reflective cloth;
 a main bracket;
 a fixed base;
 a movable base;
 an auxiliary bracket, wherein said main bracket is provided on said reflected cloth to allow said reflective cloth to be unfolded to form a box having a light outlet, wherein said main bracket is arranged on said fixed base and is extending around said fixed base, said auxiliary bracket is arranged on said movable base and is extending around said movable base, wherein said auxiliary bracket is connected between said movable base and said main bracket, wherein said movable base is movable with respect to said fixed base, wherein when said movable base is mounted and retained on said fixed base, said main bracket is unfolded by said auxiliary bracket to unfold said reflective cloth, wherein the lighting element is adapted to be installed on said movable base to project light beams to said reflective cloth; and
 a retaining member provided on said fixed base, wherein said fixed base comprises a mounting end and a free end opposite to said mounting end, wherein said mounting end of said fixed base is mounted to said reflective cloth, wherein said retaining member is configured to prevent said movable base to move toward said mounting end of said fixed base because of a push of said auxiliary bracket when said movable base is mounted on said fixed base;
 wherein said auxiliary bracket comprises a plurality of connecting arms which is radially arranged on said movable base, wherein two ends of each of said connecting arms is pivotally connected to said main bracket and said movable base to allow movement of said movable base, wherein said main bracket comprises a plurality of support arms which is radially arranged on aid fixed base, wherein by means of said retaining element, each said support arm of said main bracket, each said connecting arm of said auxiliary bracket and said movable base retained on said fixed base form a triangular structure to stably unfold said reflective cloth;
 wherein said main bracket has a central axis which pass through said fixed base and said movable base, wherein when said reflective cloth is unfolded, an include angle, which is an acute angle, is defined between said central axis and each of said connecting arms of said auxiliary bracket, wherein said retaining member is arranged between said movable base and said mounting end of said fixed base.

3. A softbox lighting kit for installing a lighting element, comprising:
 a reflective cloth;
 a main bracket;
 a fixed base;
 a movable base;
 an auxiliary bracket, wherein said main bracket is provided on said reflected cloth to allow said reflective cloth to be unfolded to form a box having a light outlet, wherein said main bracket is arranged on said fixed base and is extending around said fixed base, said auxiliary bracket is arranged on said movable base and is extending around said movable base, wherein said auxiliary bracket is connected between said movable base and said main bracket, wherein said movable base is movable with respect to said fixed base, wherein when said movable base is mounted and retained on said fixed base, said main bracket is unfolded by said auxiliary bracket to unfold said reflective cloth, wherein the lighting element is adapted to be installed on said movable base to project light beams to said reflective cloth; and
 a retaining member provided on said fixed base, wherein said fixed base comprises a mounting end and a free end opposite to said mounting end, wherein said mounting end of said fixed base is mounted to said reflective cloth, wherein said retaining member is configured to prevent said movable base to move toward said free end of said fixed base because of a push of said auxiliary bracket when said movable base is mounted on said fixed base;
 wherein said auxiliary bracket comprises a plurality of connecting arms which is radially arranged on said movable base, wherein two ends of each of said connecting arms is pivotally connected to said main bracket and said movable base to allow movement of said movable base, wherein said main bracket comprises a plurality of support arms which is radially arranged on aid fixed base, wherein by means of said retaining element, each said support arm of said main bracket, each said connecting arm of said auxiliary bracket and said movable base retained on said fixed base form a triangular structure to stably unfold said reflective cloth.

4. The softbox lighting kit according to claim 3, wherein said main bracket has a central axis which pass through said fixed base and said movable base, wherein when said reflective cloth is unfolded, an include angle, which is an obtuse angle, is defined between said central axis and each of said connecting arms of said auxiliary bracket, wherein said movable base is arranged between said retaining member and said mounting end of said fixed base.

5. A softbox lighting kit for installing a lighting element, comprising:
 a reflective cloth;
 a main bracket;
 a fixed base;
 a movable base;
 an auxiliary bracket, wherein said main bracket is provided on said reflected cloth to allow said reflective cloth to be unfolded to form a box having a light outlet, wherein said main bracket is arranged on said fixed base and is extending around said fixed base, said auxiliary bracket is arranged on said movable base and is extending around said movable base, wherein said auxiliary bracket is connected between said movable base and said main bracket, wherein said movable base is movable with respect to said fixed base, wherein when said movable base is mounted and retained on said fixed base, said main bracket is unfolded by said auxiliary bracket to unfold said reflective cloth, wherein the lighting element is adapted to be installed on said movable base to project light beams to said reflective cloth; and a retaining member provided on said fixed base, wherein said fixed base comprises a mounting end and a free end opposite to said mounting end, wherein said mounting end of said fixed base is mounted to said reflective cloth, wherein said retaining member is configured to prevent said movable base to move toward said mounting end of said fixed base because of a push of said auxiliary bracket when said movable base is mounted on said fixed base, wherein said retaining member is detachably mounted on said fixed base.

6. The softbox lighting kit according to claim 5, wherein said retaining member is screwed with said fixed base.

7. A softbox lighting kit for installing a lighting element, comprising:

a reflective cloth;
a main bracket;
a fixed base;
a movable base;
an auxiliary bracket, wherein said main bracket is provided on said reflected cloth to allow said reflective cloth to be unfolded to form a box having a light outlet, wherein said main bracket is arranged on said fixed base and is extending around said fixed base, said auxiliary bracket is arranged on said movable base and is extending around said movable base, wherein said auxiliary bracket is connected between said movable base and said main bracket, wherein said movable base is movable with respect to said fixed base, wherein when said movable base is mounted and retained on said fixed base, said main bracket is unfolded by said auxiliary bracket to unfold said reflective cloth, wherein the lighting element is adapted to be installed on said movable base to project light beams to said reflective cloth; and a retaining member provided on said fixed base and is set to be deformable, wherein said fixed base comprises a mounting end and a free end opposite to said mounting end, wherein when said movable base needs to be mounted, said retaining member is pressed to deform to allow said movable base to pass through, wherein when said movable base passes through said retaining member and is mounted to said fixed base, said retaining member automatically reset to prevent said movable base from being disengaged from said the fixed base.

8. A softbox lighting kit for installing a lighting element, comprising:

a reflective cloth;
a main bracket;
a fixed base;
a movable base;
an auxiliary bracket, wherein said main bracket is provided on said reflected cloth to allow said reflective cloth to be unfolded to form a box having a light outlet, wherein said main bracket is arranged on said fixed base and is extending around said fixed base, said auxiliary bracket is arranged on said movable base and is extending around said movable base, wherein said auxiliary bracket is connected between said movable base and said main bracket, wherein said movable base is movable with respect to said fixed base, wherein when said movable base is mounted and retained on said fixed base, said main bracket is unfolded by said auxiliary bracket to unfold said reflective cloth, wherein the lighting element is adapted to be installed on said movable base to project light beams to said reflective cloth;

wherein said movable base has a mounting groove, and said fixed base passes through said mounting groove of said movable base so as to allow said movable base to be sleeved on said fixed base.

9. A softbox lighting kit for installing a lighting element, comprising:

a reflective cloth;
a main bracket;
a fixed base;
a movable base;
an auxiliary bracket, wherein said main bracket is provided on said reflected cloth to allow said reflective cloth to be unfolded to form a box having a light outlet, wherein said main bracket is arranged on said fixed base and is extending around said fixed base, said auxiliary bracket is arranged on said movable base and is extending around said movable base, wherein said auxiliary bracket is connected between said movable base and said main bracket, wherein said movable base is movable with respect to said fixed base, wherein when said movable base is mounted and retained on said fixed base, said main bracket is unfolded by said auxiliary bracket to unfold said reflective cloth, wherein the lighting element is adapted to be installed on said movable base to project light beams to said reflective cloth;

wherein said main bracket comprises a plurality of support arms radially and pivotally provided on said fixed base and extended toward said light outlet, wherein said support arms of said main bracket are allowed to be collapsed toward said fixed base, wherein said auxiliary bracket comprises a plurality of connecting arms which is radially arranged on said movable base, wherein each of said connecting arms of said auxiliary bracket is extended between said corresponding support arm of said main bracket and said fixed base;

wherein said movable base has a plurality of mounting slots intervally arranged along a periphery of said movable base, wherein said plurality of support arms is respectively pivotally engaged to said plurality of mounting slots;

wherein said fixed base has a plurality of accommodating slots intervally arranged along a periphery of said fixed base, wherein said plurality of connecting arms is respectively pivotally engaged to said plurality of accommodating slots, wherein said plurality of accommodating slots is respectively aligned with said plurality of mounting slots, so as to allow each said support arm of said main bracket mounted to said corresponding mounting slot and each corresponding connecting arm of said auxiliary bracket mounted to said corresponding accommodating slot to form a plane that is parallel to a central axis of said main bracket.

\* \* \* \* \*